(12) United States Patent
Rushton et al.

(10) Patent No.: US 11,736,960 B2
(45) Date of Patent: *Aug. 22, 2023

(54) NODE PLACEMENT SERVICE

(71) Applicant: Verizon Patent and Licensing Inc., Basking Ridge, NJ (US)

(72) Inventors: Daniel Rushton, Pompano Beach, FL (US); Nelson A. Del Valle, Land O Lakes, FL (US); Alex E. Cihanowyz, Columbia, MD (US); Trevor Scott Pringle, Little Rock, AR (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/674,244

(22) Filed: Feb. 17, 2022

(65) Prior Publication Data

US 2022/0174513 A1   Jun. 2, 2022

Related U.S. Application Data

(63) Continuation of application No. 16/918,203, filed on Jul. 1, 2020, now Pat. No. 11,284,279.

(51) Int. Cl.
*H04W 24/02* (2009.01)
*H04W 16/18* (2009.01)
*H04W 36/22* (2009.01)
*H04W 88/08* (2009.01)
*H04W 48/16* (2009.01)
*H04W 88/06* (2009.01)

(52) U.S. Cl.
CPC .......... *H04W 24/02* (2013.01); *H04W 16/18* (2013.01); *H04W 36/22* (2013.01); *H04W 48/16* (2013.01); *H04W 88/06* (2013.01); *H04W 88/08* (2013.01)

(58) Field of Classification Search
CPC ..... H04W 24/02; H04W 16/18; H04W 36/22; H04W 48/16; H04W 88/06; H04W 88/08
See application file for complete search history.

(56) References Cited

U.S. PATENT DOCUMENTS 11,284,279 B2 *  3/2022  Rushton ............... H04W 16/18
2013/0053023 A1   2/2013  Meredith et al.

* cited by examiner

*Primary Examiner* — Diane D Mizrahi

(57) ABSTRACT

A method, a device, and a non-transitory storage medium provide a node placement service. The node placement service may generate geo-bins pertaining to a radio access network device, a sector of the radio access network device, or a sub-sector. The node placement service may generate time values for the geo-bins based on network information associated with end devices and the geo-bins. The node placement service may also generate return on investment values for the geo-bins based on the network information. The node placement service may use the time values, the return on investment values, or both for radio frequency design of a geo-bin.

20 Claims, 14 Drawing Sheets

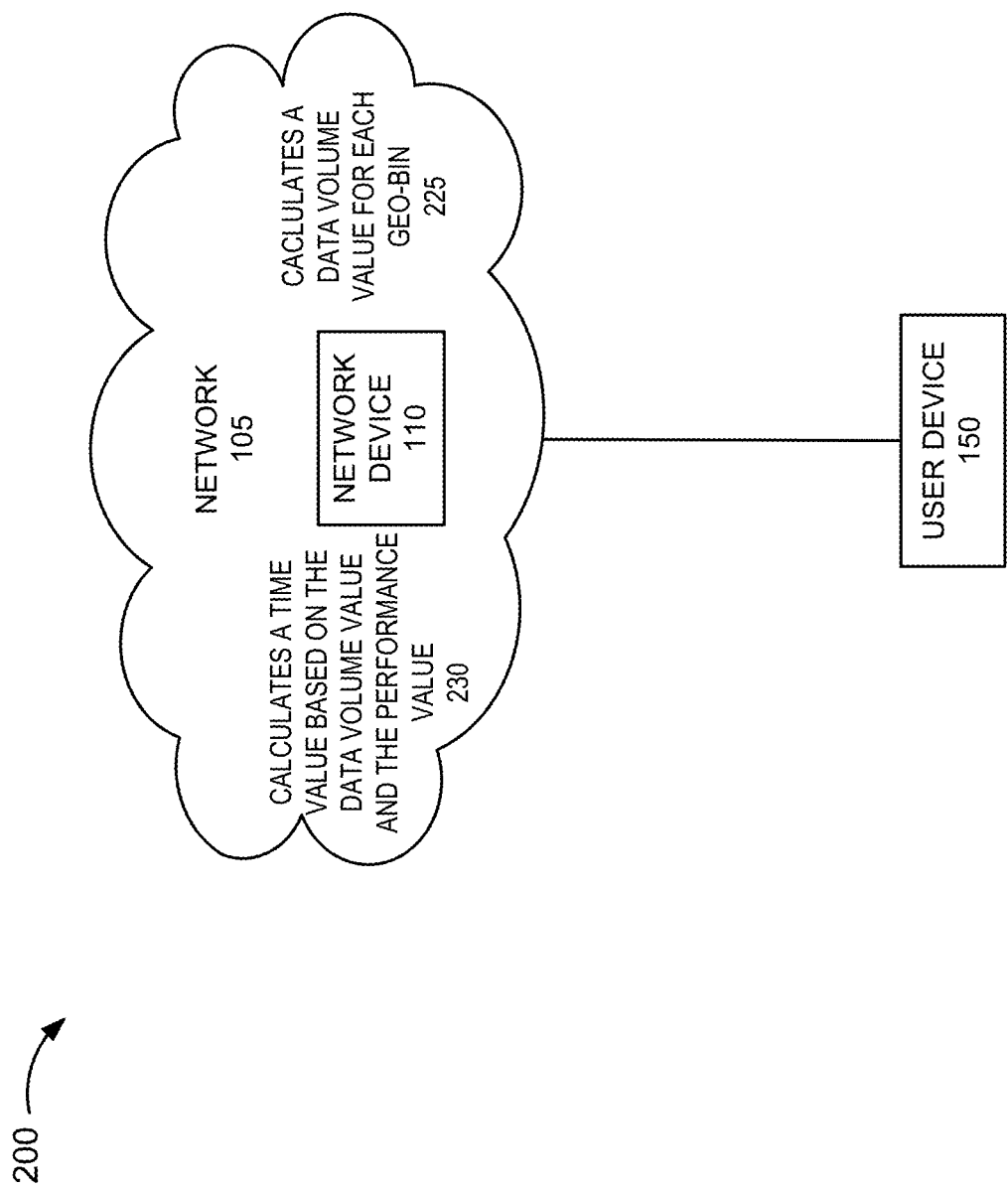

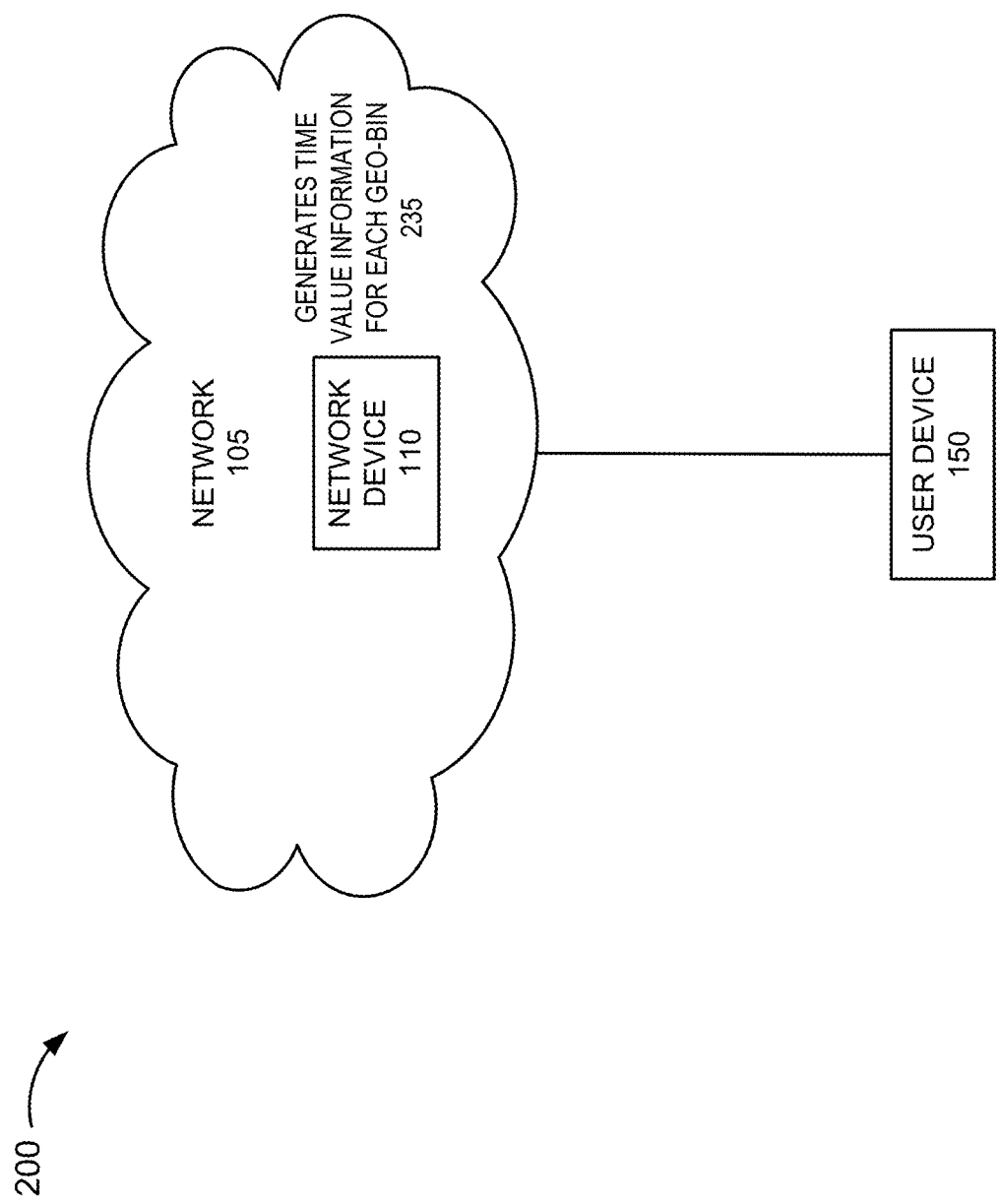

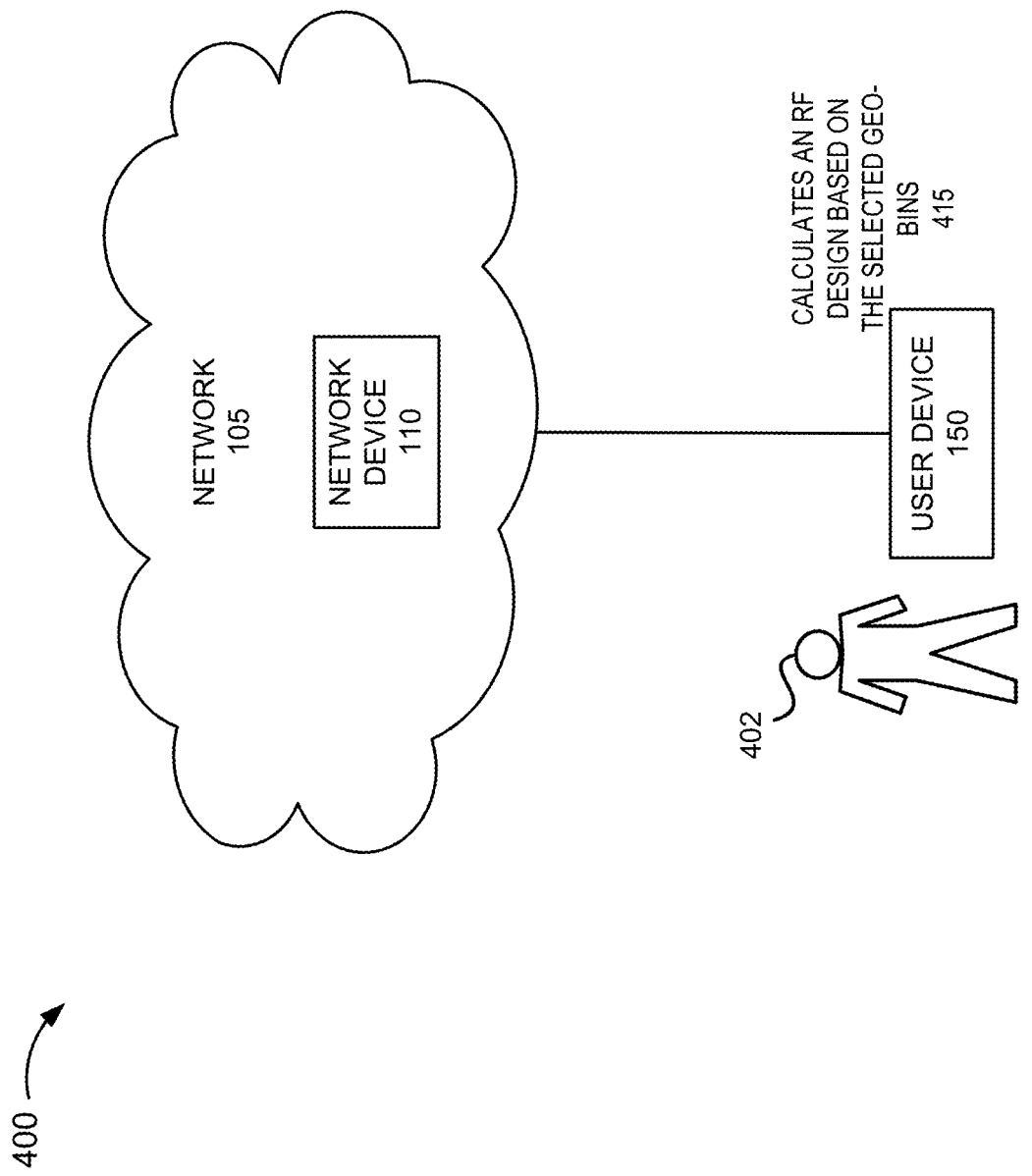

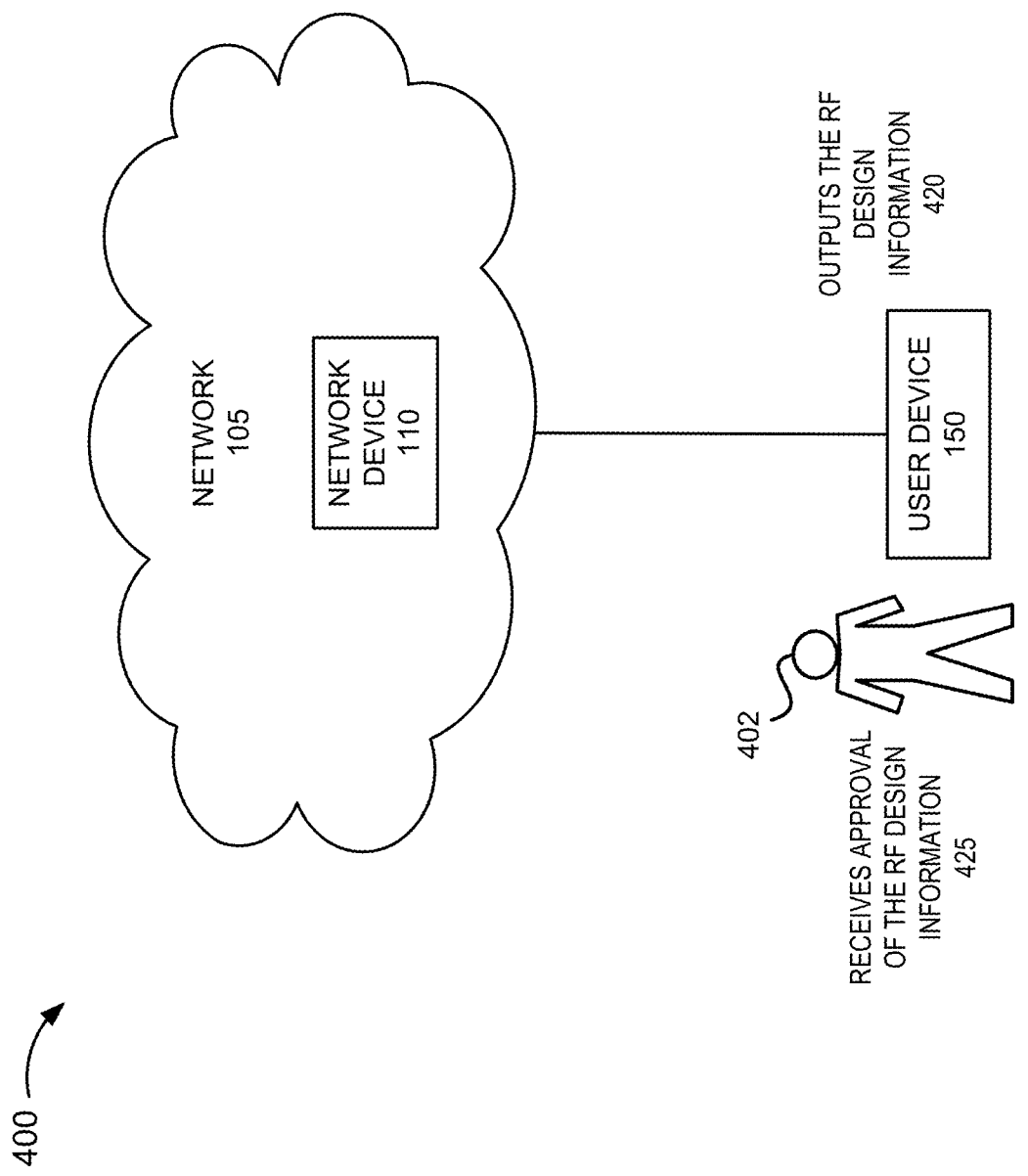

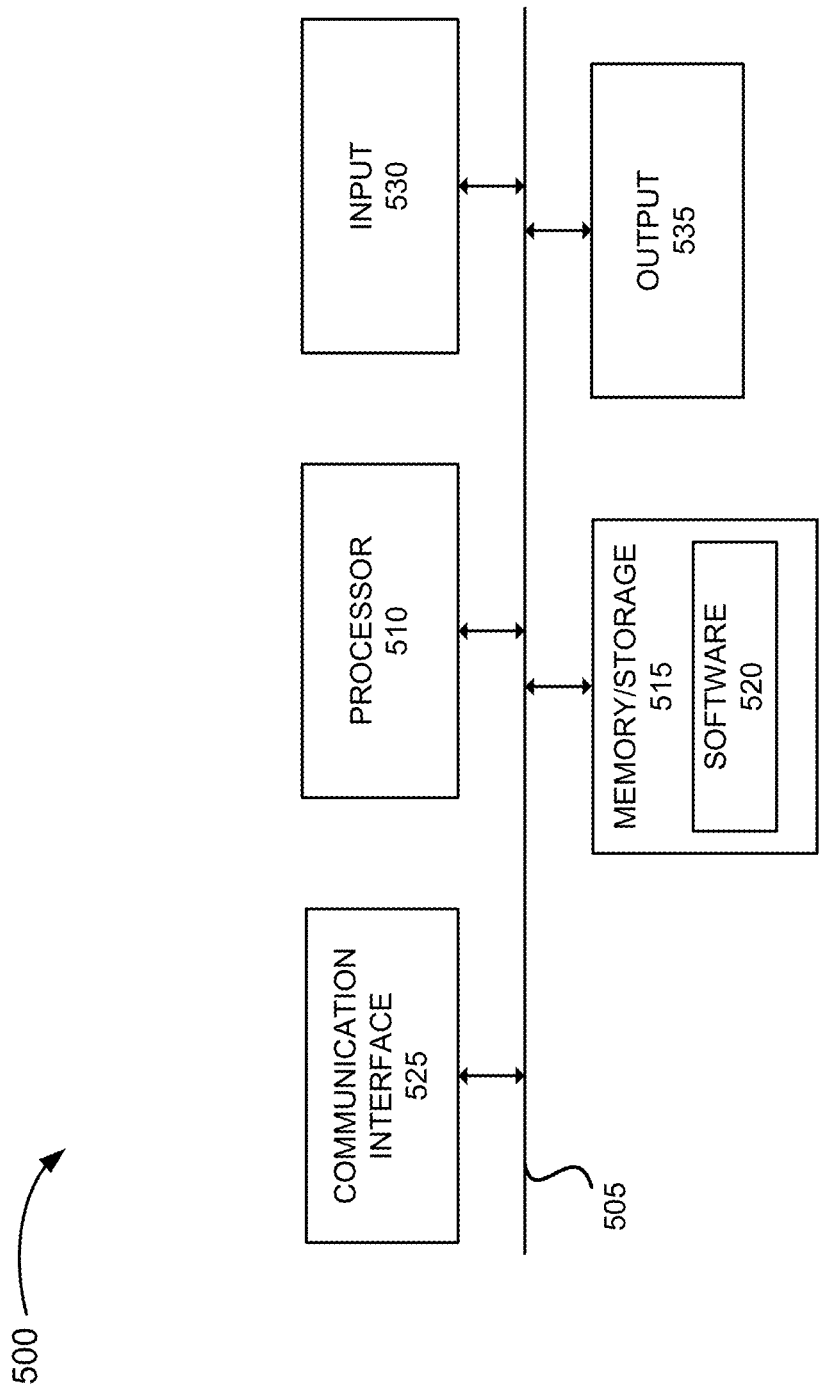

NODE PLACEMENT SERVICE

CROSS REFERENCE TO RELATED APPLICATION

This patent application is a continuation of U.S. patent application Ser. No. 16/918,203, entitled "NODE PLACEMENT SERVICE" and filed on Jul. 1, 2020, now U.S. Pat. No. 11,284,279, issued Mar. 22, 2022, the disclosure of which is incorporated by reference herein in its entirety.

BACKGROUND

Management of a network may relate to a multitude of factors, such as architecture, provisioning, network resource modeling, fault supervision, assurance and performance management, trace management, and other types of network-related supervisory and management-related factors. Network management may include the use of various tools and analytics to identify issues, faults, and planning.

BRIEF DESCRIPTION OF THE DRAWINGS

FIGS. 2A-2D are diagrams illustrating an exemplary process of the node placement service according to an exemplary scenario;

FIGS. 4A-4C are diagrams illustrating yet another exemplary process of the node placement service according to an exemplary scenario;

FIG. 5 is a diagram illustrating exemplary components of a device that may correspond to one or more of the devices illustrated herein.

DETAILED DESCRIPTION

Figure 1:
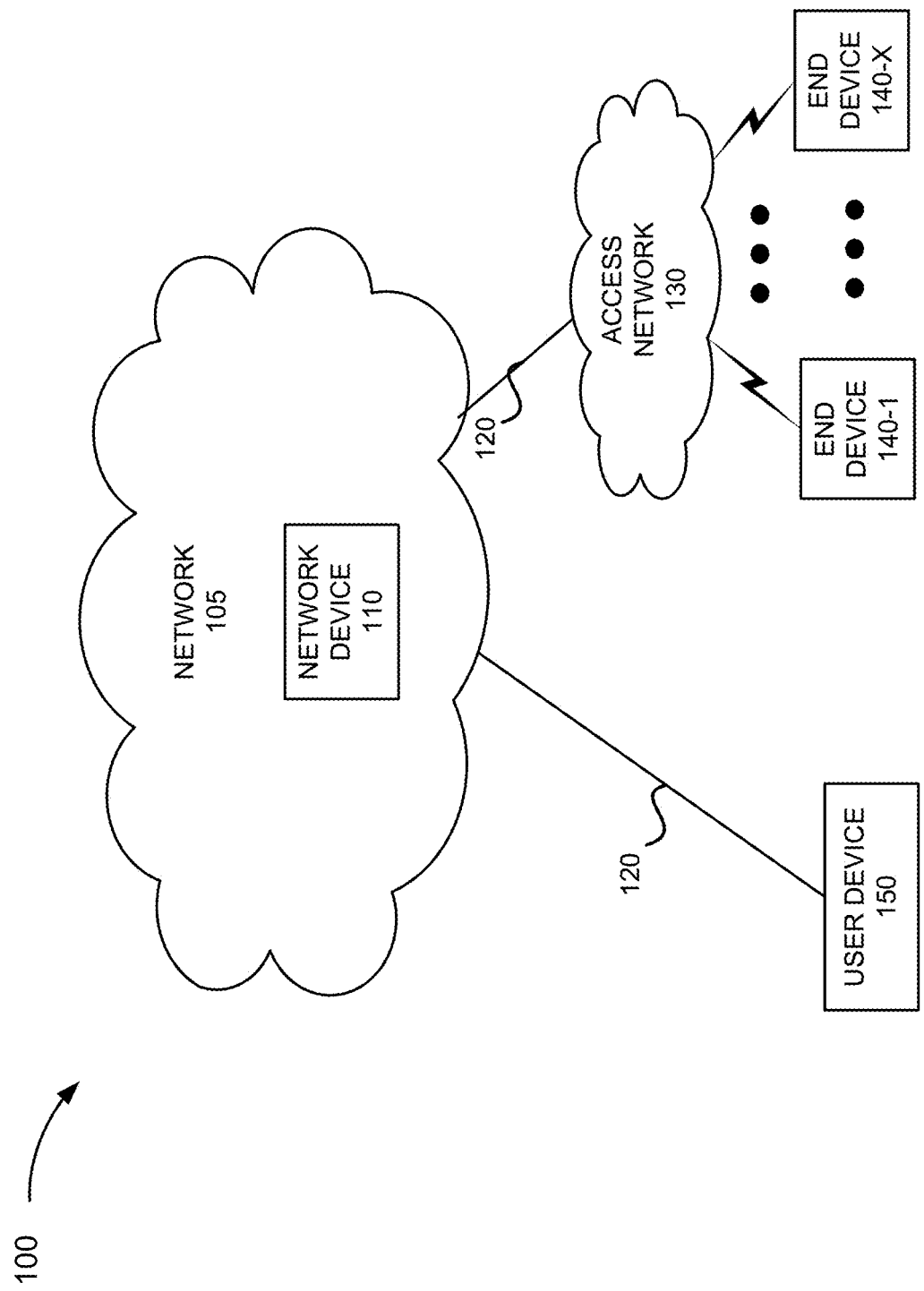
FIG. 1 is a diagram illustrating an exemplary environment in which an exemplary embodiment of a node placement service may be implemented.

The following detailed description refers to the accompanying drawings. The same reference numbers in different drawings may identify the same or similar elements. Also, the following detailed description does not limit the invention.

Management of a network, such as a large-scale network, may involve understanding the interrelationship between network resources and geographic locations. For example, a radio access network (RAN), such as a Fourth Generation (4G) RAN, a 4.5G RAN, or a Fifth Generation (5G) RAN may include various RAN devices deployed at various geographic locations.

Radio frequency (RF) decisions on RAN device placement typically involve network management personnel (e.g., RF engineers or the like) that may use a multitude of tools. Various types of information may be used in making such decisions, such as local knowledge, propagation models, distance to traffic measurements, and other types of information. However, the relative weights to place on the various types of information for selecting a position of a RAN device can vary widely among network management personnel. This may produce inconsistent and/or sub-optimal results. Additionally, other decisions may include whether a prospective location already has sufficient coverage, whether an additional RAN device may be needed, and other factors relating to RAN device placement.

Given the ever-increasing number of users and end devices, and the densification of RAN devices within a locale, accurately identifying areas to place the RAN device may be a necessary step of a RAN device placement process. For example, RAN devices that may be positioned too close to each other may increase interference on the uplink and/or the downlink and may be an inefficient deployment of resources. By way of further example, an improperly placed RAN device may not produce a desired signal-to-noise ratio (SNR) in the downlink to support end devices, or the end devices may have to increase their uplink power to ensure their signal reaches the RAN device, which may increase uplink interference relative to a neighboring RAN device.

Decisions surrounding the placement of RAN devices across a RAN may form the basis for other network planning and management tasks, such as physical cell identifier (PCI) planning, root sequence identifier (RSI) planning, cell interference management, inter-site distance (ISD) planning, nearest neighbor analysis, RAN device configurations (e.g., antenna tilt, transmit power, etc.), and other types of network considerations (e.g., cell coverage, etc.).

According to exemplary embodiments, a node placement service is provided. According to exemplary embodiments, the node placement service may provide RAN device placement decisions for a geographic area. According to an exemplary embodiment, the node placement service may be applied to various types of RAN devices of a RAN, as described herein.

According to an exemplary embodiment, the node placement service may use network information to identify a traffic profile of a geographic area over a time period. For example, the network information may include performance data, geographic data, and other types of information, as described herein.

According to an exemplary embodiment, the node placement service may calculate a time value based on the volume of traffic associated with a geographic area over the time period and a performance metric. For example, the performance metric may include throughput of an uplink and/or a downlink associated with an end device. According to other examples, the performance metric may be different. The granularity of the geographic area may be configurable and accommodate the positioning of low power RAN devices and ultra-densification of various RAN devices, as described herein.

According to an exemplary embodiment, the node placement service may prioritize geographic areas based on the time values associated with each geographic area. For example, a geographic area with a high time value or that satisfies a threshold value may be prioritized over another geographic area with a lower time value or that does not satisfy the threshold value. According to an exemplary embodiment, the prioritization may be based on a revenue score value associated with the geographic areas and/or other criterion, as described herein.

In view of the foregoing, the node placement service may improve RF network planning and optimization. For example, the node placement service may identify and accurately map geographic locations where the RAN device may be positioned based on usage behavior and other factors.

The node placement service may also improve the outcome of other network management tasks that may be based on RAN device placement. The node placement service may minimize the introduction of variances due to human influence regarding RAN device placement decisions.

FIG. 1 is a diagram illustrating an exemplary environment 100 in which an exemplary embodiment of the node placement service may be implemented. As illustrated, environment 100 includes a network 105, a network device 110, and a user device 150. Environment 100 includes a link 120 between network 105 and user device 150.

As further illustrated, for description purposes, environment 100 may further include an access network 130 and end devices 140-1 through 140-X (also referred to as end devices 140, or individually or generally as end device 140). Access network 130 and end devices 140 relate to the node placement service, as described herein.

Network 105 includes one or multiple networks of one or multiple types. For example, network 105 may be implemented to include an access network (e.g., a RAN, a WiMax network, a Wi-Fi network, etc.), a core network, an optical network, the Internet, a mobile network, a wired network, a local area network (LAN), a service provider network, a network provider network, a private Internet Protocol (IP) network, an application layer network, a cloud network, a virtual network, and/or another type of network.

Network device 110 may include a device that has computational and communicative capabilities. According to some exemplary implementations, network device 110 may be included in an operations support system (OSS), a business support system (BSS), or other type of support system. According to an exemplary embodiment, network device 110 includes logic, in whole or in part, that provides the node placement service, as described herein.

According to an exemplary embodiment, network device 110 may store, manage, and/or have access to information that supports the node placement service, as described herein. According to an exemplary embodiment, the information may include map information. For example, the map information may include a map of a geographic area (e.g., country, state, county, city, town, province, region, city blocks, locale, portion thereof, or other type of region). According to an exemplary implementation, the map information may also include information pertaining to where RAN devices of access network 130 may be situated in a geographic area, as well as other information pertaining to access network 130, RAN devices, and/or other network elements (e.g., optical fiber, backhaul network, fronthaul network, etc.).

According to an exemplary embodiment, the information that supports the node placement service may include network information. For example, various system tools and/or network servers (not illustrated), such as TrueCall® and/or other monitoring and/or analytics systems that may obtain network information pertaining to network traffic (e.g., uplink and/or downlink traffic) associated with access network 130 and end devices 140. The network information may include end device records that may indicate traffic or sessions data and performance data (e.g., Key Performance Indicators (KPIs), network performance metrics that correlate to Quality of Experience (QOE), Mean Opinion Score (MOS), Quality of Service (QoS) values, etc.) associated with end devices 140. For example, the performance data may indicate values relating to the performance associated with user sessions, connections, channels, messaging (e.g., protocol level, etc.), bit rates, packet error loss rates, and other performance indicators (e.g., throughputs, etc.) of the wireless service in relation to RAN devices and/or access network 130. The end device records may include geographic information (e.g., latitude/longitude values, location values, etc.) pertaining to end devices 140 and the size of the communications (e.g., bytes, Kilobytes, Megabytes, Gigabytes, etc.) associated with the user sessions.

According to various exemplary embodiments, the network information may pertain to a single RAN device, multiple RAN devices (e.g., a subset of all RAN devices), or all RAN devices of access network 130. Additionally, or alternatively, the network information may pertain to RAN devices associated with other types of criteria, such as carrier (e.g., carrier frequency, sector of a cell, etc.), type of radio access technology (RAT), geographic location of RAN device, time period (e.g., day, day and time period, etc.), type of RAN device (e.g., evolved Node B (eNB), next generation Node B (gNB), and/or other types of RAN devices, as described herein), and/or other types of factors (e.g., city versus rural, high versus low density, etc.) that may indicate a characteristic or an attribute pertaining to the RAN device.

The network information may also include information reported by end devices 140, such as quality measurement information. For example, the quality measurement information may include a Reference Signal Receive Power (RSRP) value, a Received Signal Strength Indicator (RSSI), a Reference Signal Received Quality (RSRQ) value, or an analogous type of measurement, such as an SNR, a signal-to-interference-plus-noise ratio (SINRs), or another type of channel condition value.

Network device 110 may store, manage, and/or have access to information pertaining to RAN devices of access network 130. The information stored by network device 110 may include location information pertaining to a RAN device. For example, the location information may include geographic coordinates (e.g., latitude/longitude values) of a geographic coordinate system (GCS), or coordinate values associated with another type of coordinate system (e.g., a projected coordinate system (PCS), etc.). The information may also include other parameter values relating to azimuth, vertical angle, elevation, and/or other similar parameter values. The information may store other types of information relating to various components of the RAN device, such as antennas (e.g., height, geographic location, number, type, gain, transmit loss, receive loss, receive signal, fade margin (e.g., thermal, effective, etc.)), and other characteristics or configurations of the RAN device.

Link 120 may include one or multiple communication links via which user device 150 and network device 110 may communicate with each other. For example, link 120 may include a wireless link, a wired link, and/or an optical link.

User device 150 may include a device that has computational and communicative capabilities. User device 150 may be implemented as a computer, a terminal device, or another suitable end user device. According to an exemplary embodiment, user device 150 includes logic, in whole or in part, that provides the node placement service. For example, user device 150 may include software that performs an operation or a process of the node placement service. The software may include graphical user interfaces that provide an interactive environment for a user (not illustrated) in support of the node placement service. User device 150 may include software that permits user device 150 to query and/or retrieve information stored by or accessible to network device 110, as described herein. User device 150 may include software for RAN planning and design, and/or other tools that may support the node placement service, as described herein.

As described, the node placement service may pertain to access network 130 and end devices 140. Access network 130 may be implemented to include a next generation RAN (e.g., a Fifth Generation (5G) or new radio (NR) RAN)), another type of future generation RAN, a Fourth Generation (4G) RAN (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network), a RAN of an LTE-A Pro network, and/or another type of RAN (e.g., a legacy Third Generation (3G) RAN, etc.).

Depending on the implementation, the RAN devices of access network 130 may include one or multiple types of network devices. For example, the RAN devices may include a gNB, an eNB, an evolved LTE (eLTE) eNB, a remote radio head (RRH), a baseband unit (BBU), a centralized unit (CU), a distributed unit (DU), a future generation wireless access device, or another type of wireless node that provides a wireless access service. According to some exemplary implementations, the RAN device may include a combined functionality of multiple radio access technologies (RATs) (e.g., 4G, 4.5G, 5G functionality). Also, access network 130 may be implemented to include various architectures of wireless service, such as, for example, macrocell, microcell, femtocell, picocell, metrocell, NR cell, LTE cell, or another type of architecture. Additionally, access network 130 may be implemented according to various wireless technologies (e.g., RATs, etc.), wireless standards, wireless frequencies/bands/carriers (e.g., centimeter (cm) wave, millimeter (mm) wave, below 6 GHz, above 6 GHz, licensed radio spectrum, unlicensed radio spectrum, NR low band, NR mid-band, NR high band, etc.), and/or other attributes of radio communication.

End device 140 may include a device that has computational and wireless communicative capabilities. Depending on the implementation, end device 140 may be a mobile device, a portable device, a stationary device, a device operated by a user (e.g., user equipment (UE), etc.), or a device not operated by a user (e.g., an Internet of Things (IoT) device, etc.). For example, end device 140 may be implemented as a smartphone, a mobile phone, a personal digital assistant, a tablet, a netbook, a phablet, a wearable device (e.g., a watch, glasses, etc.), a computer, a device in a vehicle, a gaming device, a music device, an IoT device, or other type of wireless device. End device 140 may be configured to execute various types of software (e.g., applications, programs, etc.). The number and the types of software may vary among end devices 140.

A network device, such as network device 110, may be implemented according to a centralized computing architecture, a distributed computing architecture, or a cloud computing architecture (e.g., an elastic cloud, a private cloud, a public cloud, etc.). Additionally, user device 150 and/or network device 110 may be implemented according to one or multiple network architectures (e.g., a client device, a server device, a peer device, a proxy device, and/or a cloud device).

The number of devices, the number of networks, and the configuration in environment 100 are exemplary. According to other embodiments, environment 100 may include additional devices, fewer devices, and/or differently arranged devices, than those illustrated in FIG. 1. For example, according to other embodiments, environment 100 may not include user device 150 or network 105, network device 110, and link 120.

Figure 2A:
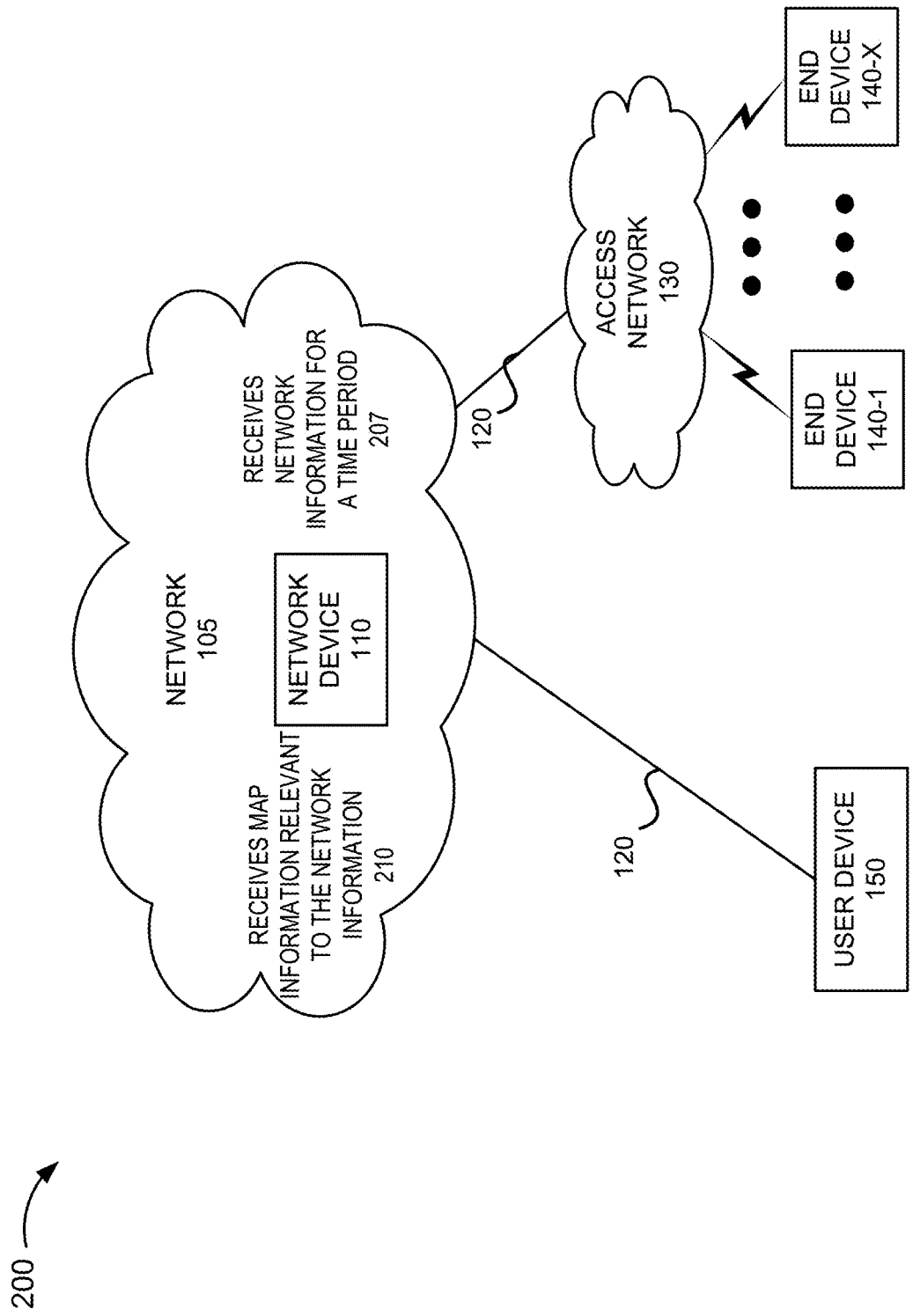

FIGS. 2A-2D are diagrams illustrating an exemplary process 200 of the node placement service. Referring to FIG. 2A, according to an exemplary scenario, network device 110 may receive network information pertaining to a period of time 207 and a geographic area associated with access network 130 and end devices 140. The period of time may be configurable. For example, the time period may be for a month or a different time period.

Network device 110 may receive map information of relevance to the network information 210. For example, the map information may include a geographic area associated with the locations of end devices 140 and a wireless service provided by one or multiple RAN devices of access network 130.

Figure 2B:
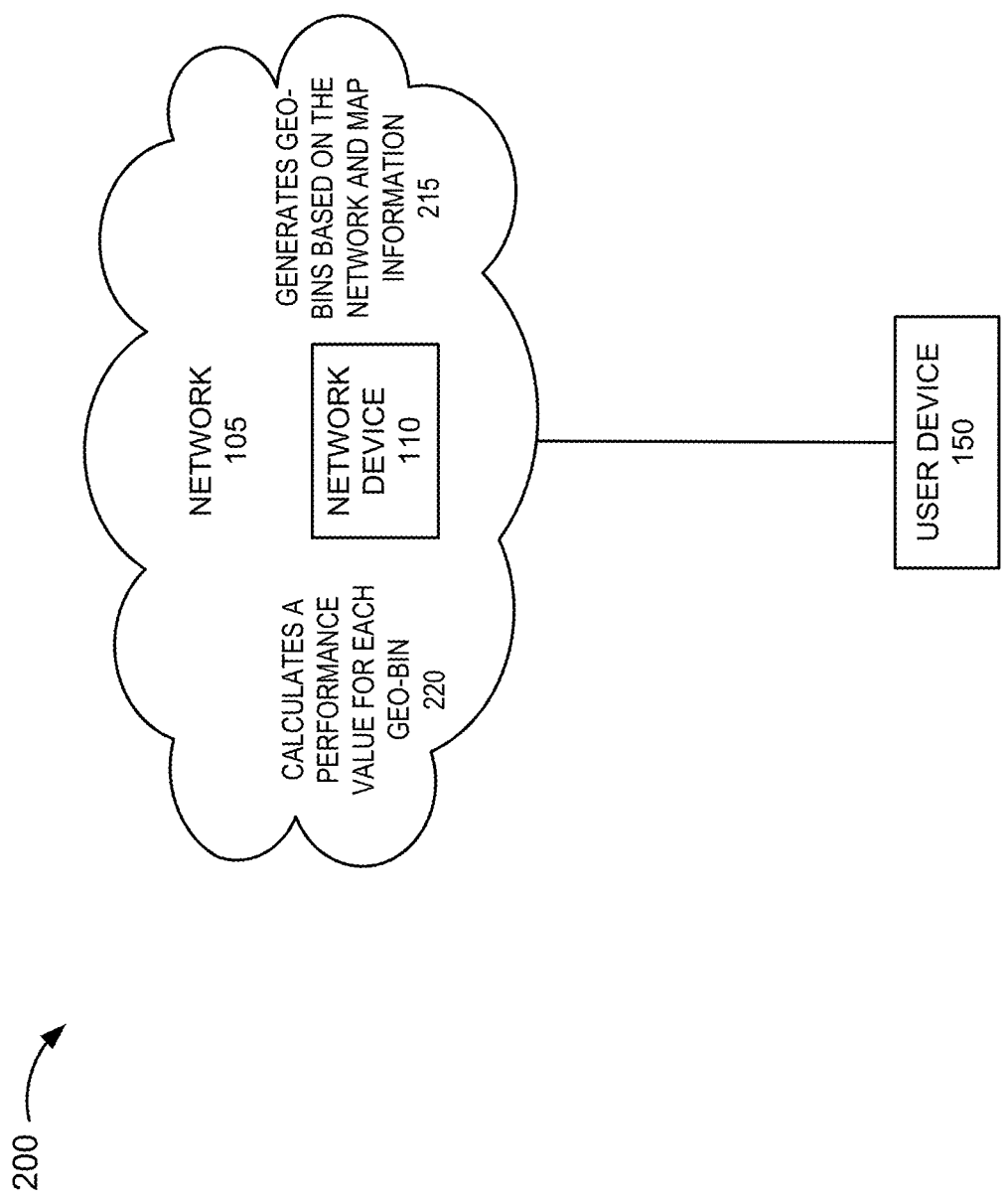

Referring to FIG. 2B, network device 110 may generate geo-bins based on the network information and the map information 215. For example, the geo-bins may be generated based on a Military Grid Reference System (MGRS) or other type of grid system. The size (e.g., area) and/or shape of each geo-bin may be configurable. For example, the shape of the geo-bin may be a square, a rectangle, a polygon, or other type of shape, and the area may be 100 meters or some other value. The size and/or the shape of the geo-bin may depend on the types of RAN devices (e.g., eNB versus gNB) and/or attributes of the RAN devices (e.g., antenna configuration) to which the network information pertains. According to an exemplary implementation, the size of the geo-bin may be about the same size or smaller than the cell's coverage area. According to another exemplary implementation, the size of the geo-bin may be about the same size or smaller than a sector's coverage area associated with the RAN device. According to yet other exemplary implementations, the size of the geo-bin may be about the same size or smaller than a planar array of antenna's coverage area or a set of antenna's (e.g., single or multiple antennas) coverage area. The RAN device of access network 130 may include one or multiple sectors or antennas. The antenna may be implemented according to various configurations, such as single input single output (SISO), single input multiple output (SIMO), multiple input single output (MISO), multiple input multiple output (MIMO), massive MIMO, three dimensional (3D) beamforming (also known as full-dimensional MIMO), 2D beamforming, antenna spacing, tilt (relative to the ground), a radiation pattern, directivity, elevation, and so forth. Each of the geo-bins may include their respective network information associated with end devices 140. For example, the location information of end devices 140 may allow a mapping of the network information (e.g., traffic, etc.) to a geo-bin. Additionally, each geo-bin may be associated with an identifier. For example, each geo-bin may have a unique value (e.g., numerical, a string value, etc.) that provides a segmentation of a geographic area subject to the node placement service.

As further illustrated, process 200 may include network device 110 calculating a performance value for each geo-bin 220. According to an exemplary embodiment, the performance value may include a throughput value. For example, the performance value may include a downlink throughput value, an uplink throughput value, or both. According to another example, the performance value may include an average throughput value based on the time period and the network information associated with each geo-bin. According to other exemplary embodiments, the performance value may include other types of performance metrics (e.g., packet drop rates, latency, error rate, or another QoS parameter).

Referring to FIG. 2C, network device 110 may calculate a data volume value for each geo-bin 225. For example, the data volume value may include a forward data volume value, a reverse data volume value, or both. The data volume value may indicate a total amount of data transmitted and/or received within the geo-bin. As further illustrated, network device 110 may calculate a time value for each geo-bin based on the data volume value and the performance value 230. For example, network device 110 may calculate the time value based on the exemplary expression:

$$T = DV/\text{Throughput} \quad (1),$$

where T indicates the time value, DV indicates a data volume value, and Throughput indicates a throughput value (amount of data/time). As such, the time value may indicate the length of time the resources of the RAN device associated with the geo-bin are engaged.

Referring to FIG. 2D, network device 110 may generate time value information for each geo-bin 235. Network device 110 may calculate a summation of the time values attributable to end devices 140 of relevance for each geo-bin. For example, each geo-bin may be associated with a time value. The time value may be in seconds or some other unit of time measurement. The geo-bins and associated time value information may be used by the node placement service. For example, the time value may be used to prioritize the geo-bins relating to an RF plan, such as migrating from 4G service to 5G service, supplementing a sector or other geographic area associated with a RAN device with additional and/or different carrier nodes (e.g., low coverage/power nodes, small cell nodes (e.g., picocell, femtocell, relay nodes, etc.), in-building distributed antenna systems (iDAS), outdoor DAS (oDAS), 5G ultra-wide band (UWB) nodes, Citizens Broadcast Radio Service (CBRS) nodes, Licensed Assisted Access (LAA) nodes, C-band nodes, etc.). According to this example, given the relationship between DV and Throughput, the time values may indicate various gradations of performance or user experience. For example, given the ratio between data volume and throughput, high time values may indicate low performance or user experience and low time values may indicate high performance or user experience. In this regard, geo-bins with high time values may be targeted for adjustment of their current radio frequency design, while geo-bins with low time values may not be targeted for any adjustment of the current radio access deployment. This information may be calculated and stored to provide a signature of the current radio frequency design and isolate any coverage areas that may need to be addressed and/or improved by way of re-design (e.g., future placement of radio access nodes, etc.).

Figure 2E:
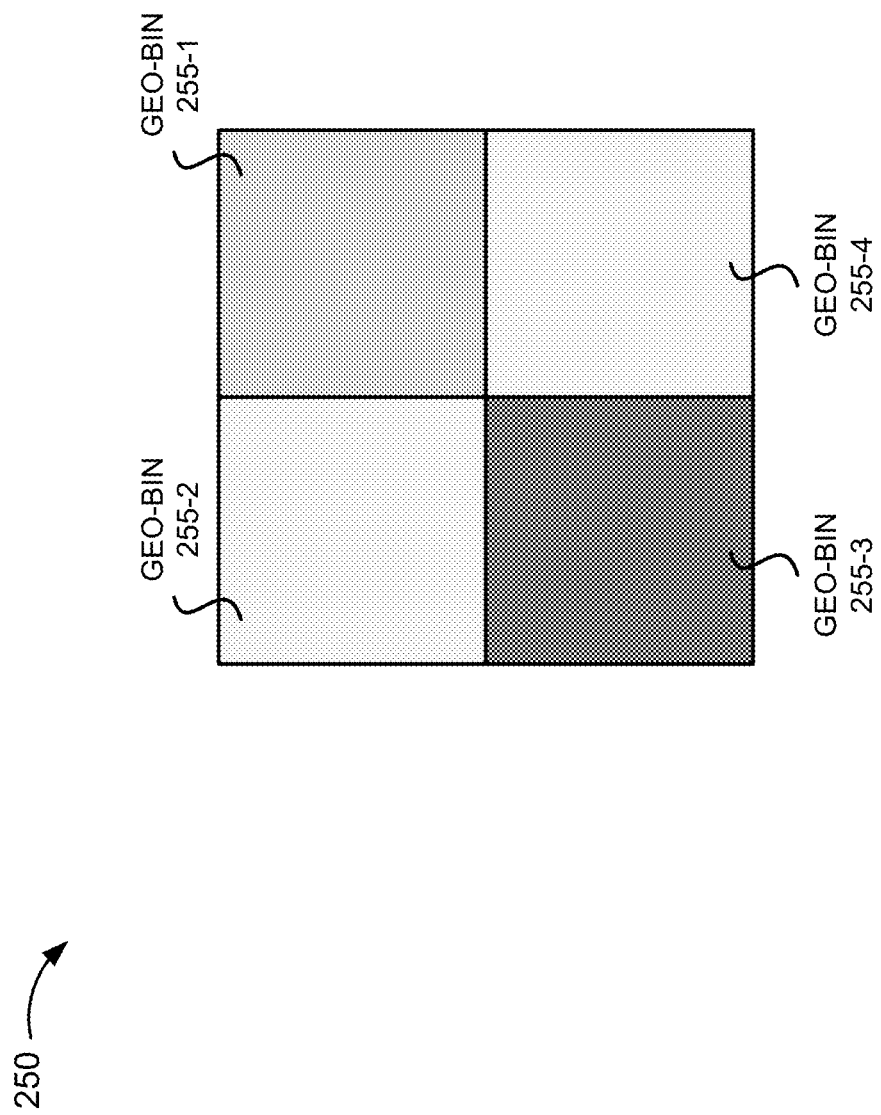
FIG. 2E is a diagram illustrating an exemplary representation of the time value information.

According to some exemplary embodiments, the variations of time values among different geo-bins of a geographic area may be represented in graphical user interface. For example, the time values may be represented numerically, by variations in color, or other types of indicators. FIG. 2E is a diagram illustrating an exemplary representation 250 of geo-bins 255-1 through 255-4 (also referred to as geo-bins 255, or individually or generally as geo-bin 255). The number and shape of geo-bin 255 are exemplary. Geo-bins 255 may pertain to a RAN device's coverage area at a cell, sector, or sub-sector level, in whole or in part. As illustrated in this example, the time values associated with each geo-bin may be indicated by way of color or shading. Other representations of the time value of geo-bin 255 may be implemented. Geo-bins 255 may also be represented as an overlay to map information. A process in which the node placement service may use the time value information is further described below.

Although FIGS. 2A-2D illustrate an exemplary embodiment of a process of the node placement service, according to other exemplary scenarios, the node placement service may perform additional operations, fewer operations, and/or different operations than those illustrated and described.

Figure 3A:
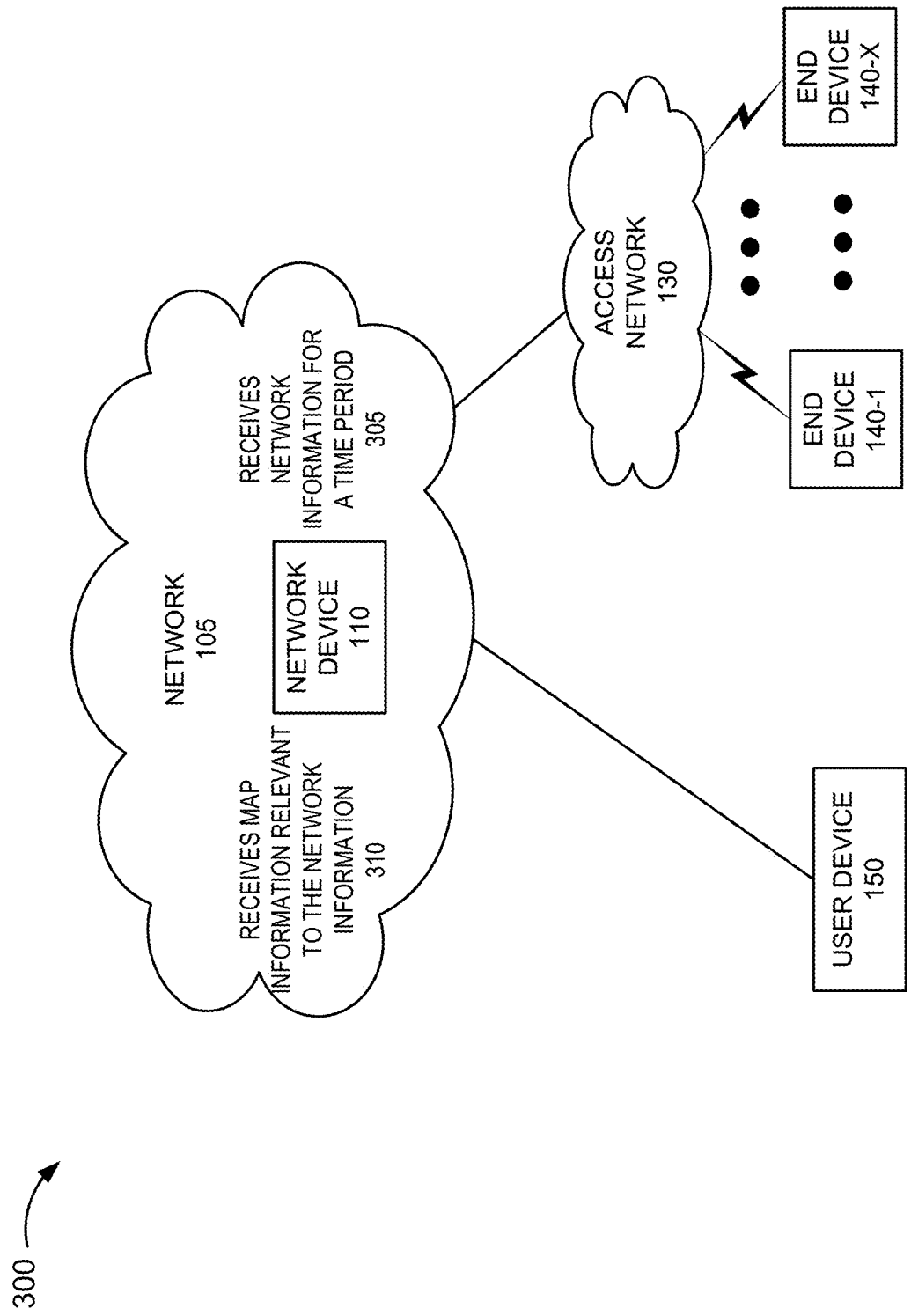
FIGS. 3A-3C are diagrams illustrating another exemplary process of the node placement service according to an exemplary scenario.
Figure 3B:
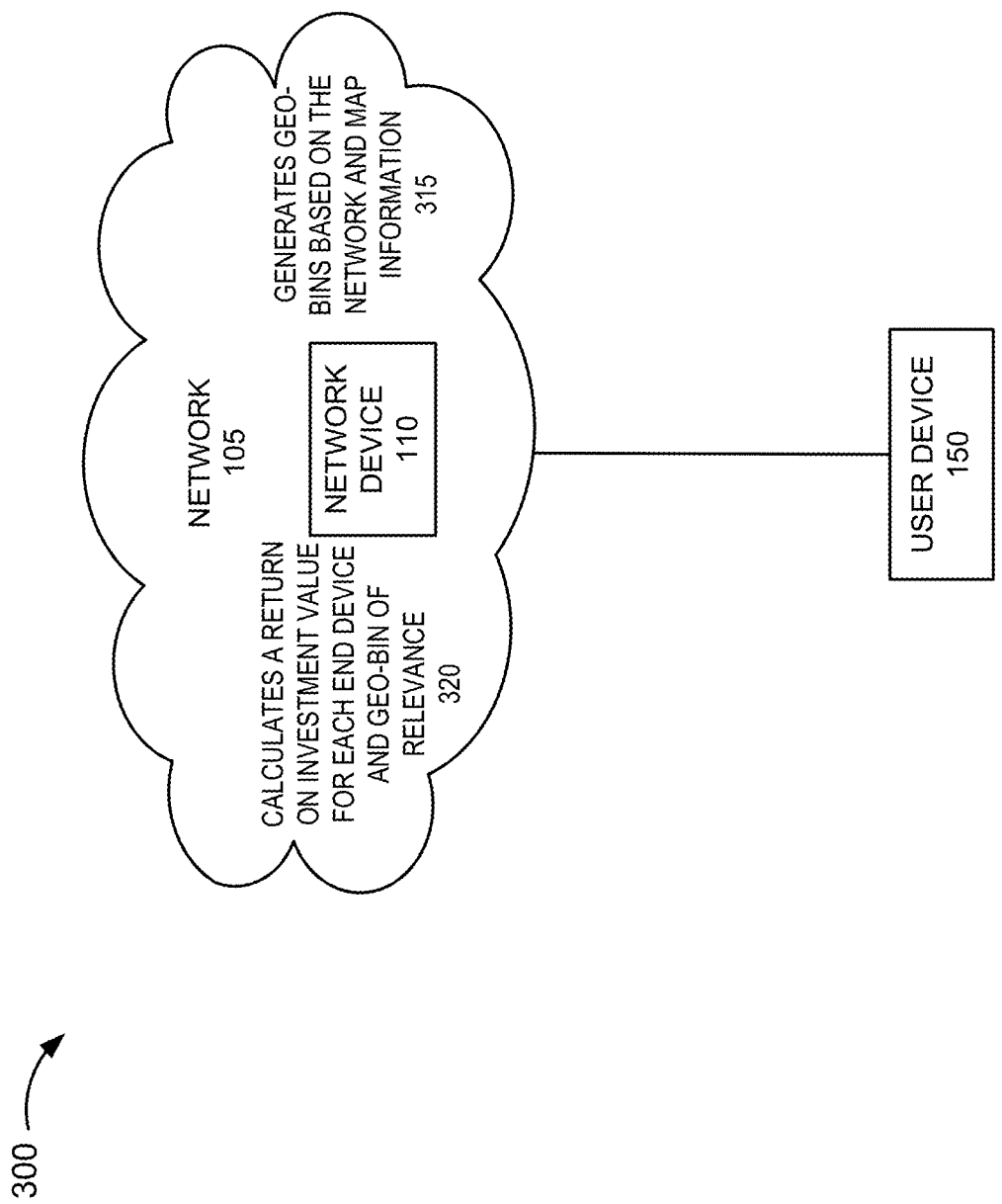

FIGS. 3A and 3B are diagrams illustrating another exemplary process 300 of the node placement service. Referring to FIG. 3A, process 300 may be similar to that of process 200 of FIG. 2A, and will not be repeated for the sake of brevity. Referring to FIG. 3B, similar to step 215 of FIG. 2B, network device 110 may generate geo-bins based on the network and map information 315. Also, network device 110 may calculate a return on investment (ROI) value for each end device 140 and geo-bin of relevance 320. For example, the network information may include an identifier of end device 140, such as mobile directory number (MDN), an International Mobile Subscriber Identity (IMSI), a media access control (MAC) address, a Subscription Concealed Identifier (SUPI), or another type of (unique) identifier of end device 140. The identifier of end device 140 may be correlated with the data volume value associated with the geo-bin of relevance. Additionally, the monetary amount of a subscription to the wireless service associated with end device 140 may be determined (e.g., via a billing system). Network device 110 may calculate the ROI value for geo-bins of relevance associated with end device 140. As an example, Table I illustrates exemplary information in support of the ROI value calculation. The type of information and the values are exemplary.

TABLE I

| Geo-bin ID | Data Volume (MBs) | Data Volume % | ROI ($) |
|---|---|---|---|
| 1 | 100 | 6.2 | 5.03 |
| 2 | 150 | 9.43 | 7.55 |
| 3 | 50 | 3.14 | 2.52 |
| 4 | 500 | 31.45 | 25.16 |
| 5 | 25 | 1.57 | 1.26 |
| 6 | 40 | 2.52 | 2.01 |
| 7 | 275 | 17.3 | 13.84 |
| 8 | 125 | 7.86 | 6.29 |
| 9 | 225 | 14.15% | 11.32 |
| 10 | 100 | 6.29% | 5.03 |

Referring to Table I, assume for a particular end device 140, a user has a subscription plan of $80/month. Also, assume for step 305, the network information received relates to a time period of 1 month, and during the month, the user was located within geo-bins, which are identified as 1-10, and had the associated data usage (e.g., data volume). Based on this information, network device 110 may calculate an ROI value for each geo-bin of relevance to this user/end device 140. Network device 110 may calculate ROI values for other users/end devices 140 in relation to geo-bins of relevance, and sum the ROI values belonging to the same geo-bin.

Figure 3C:
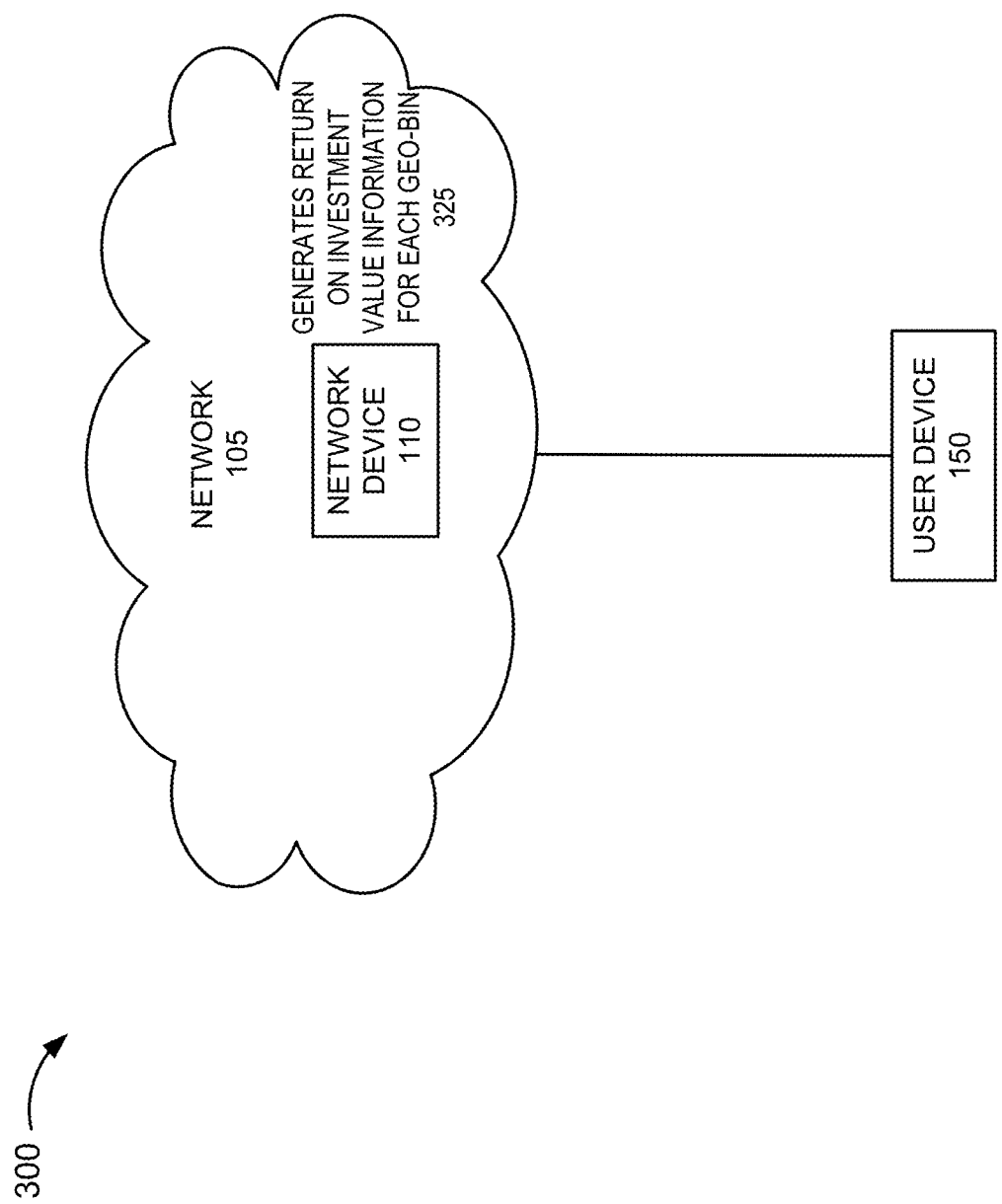

Referring to FIG. 3C, network device 110 may generate ROI value information for each geo-bin 235. Network device 110 may calculate a summation of the ROI values attributable to end devices 140 of relevance for each geo-bin. In this way, each geo-bin may be associated with an ROI value. The geo-bins and associated ROI value information may be used by the node placement service. For example, the ROI value may be used to prioritize the geo-bins relating to an RF plan, such as migrating from 4G service to 5G service, supplementing a sector or other geographic area associated with a RAN device with additional and/or different carrier nodes. According to some exemplary embodiments, the variations of ROI values (or other types of values) among different geo-bins of a geographic area may be represented in graphical user interface. For example, the ROI values may be represented numerically, variations in color, or other types of indicators. For example, similar to that previously illustrated and described in relation to FIG. 2E, ROI values (or other values) associated with geo-bins 255 may be represented via a graphical user interface. The graphical user interface may be used by a user of user device 150 to identify geo-bins 255 that may be subject to a (candidate) RF design and/or the node placement service. Additionally, when both the time value information and the monetary value information are used, the graphical user interface may include a representation of both values for each geo-bin, including for example, numerically, color or shading, or other types of indicators. A process in which the node placement service may use the monetary value information is further described below.

Although FIGS. 3A-3C illustrate an exemplary embodiment of a process of the node placement service, according to other exemplary scenarios, the node placement service may perform additional operations, fewer operations, and/or different operations than those illustrated and described.

As described herein, according to various exemplary embodiments, the node placement service may use the time value information, the ROI value information, or both, relating to RF planning, such as node placement. According to some exemplary embodiments, when both types of information are used, the time value information and the monetary value information may be equally weighted. According to other exemplary embodiments, when both types of information are used, the time value information and the monetary value information may not be equally weighted. The node placement service may be configured to prioritize some geo-bins over other geo-bins based on their time values and/or ROI values. According to an exemplary embodiment, the prioritization may relate to which geo-bins are subject to an RF design.

There are a multitude of factors or criteria (e.g., poor user experience, migration to NR, a threshold time value not met, congestion, etc.) that may be used as a basis for triggering the new RF design that are not exhaustively described in this disclosure. Additionally, the new RF design may involve a multitude of factors or criteria (e.g., the selection of RAN devices, the number of RAN devices, a budget, the size of the geographic area subject to the new RF design, a coverage target of a geographic area (e.g., 80% or some other percentage), propagation modeling, etc.) that are not exhaustively described in this disclosure.

According to some exemplary embodiments, the triggering of the new RF design may be performed in automated manner (e.g., by network device 110 and/or user device 150), in whole or in part, based on the time value information and/or the ROI value information associated with a geo-bin. For example, the time value information and/or the ROI value information may be analyzed relative to one or multiple threshold values (e.g., a threshold time value, a threshold ROI value, etc.). According to other examples, other factors may be used, apart from or in combination with the time value information and/or the ROI value information, as a basis for triggering the new RF design. According to other exemplary embodiments, the triggering of the new RF design may be initiated solely by a user of user device 150, by a combination of the user and a recommendation by network device 110 and/or user device 150, or according to other procedures implemented by a service provider, a network provider, or other type of entity.

Figure 4A:
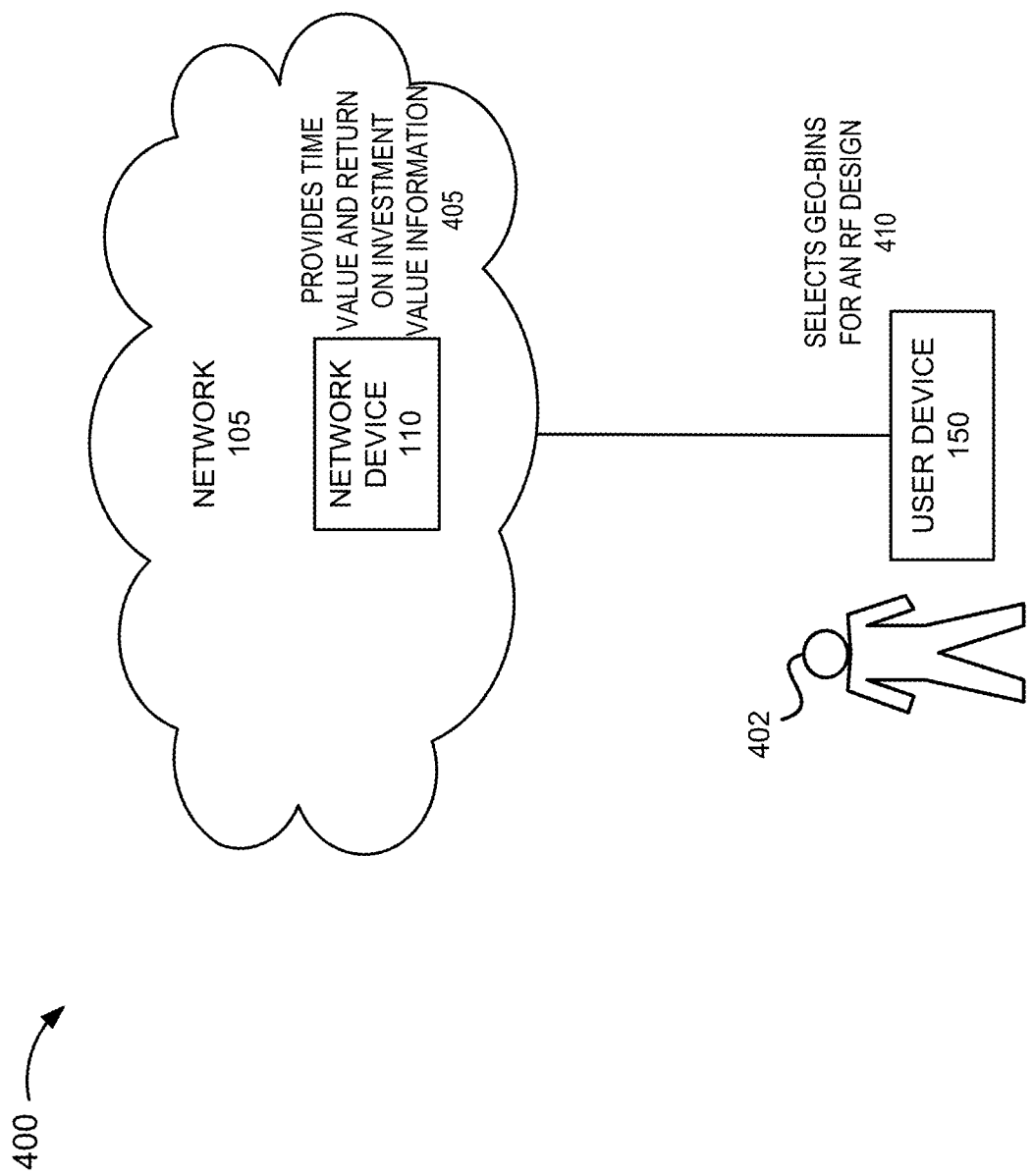

FIGS. 4A-4C are diagrams that illustrate yet another exemplary process 400 of the node placement service. According to this exemplary scenario, assume that network device 110 has generated both time value information and ROI value information. However, according to other exemplary scenarios this may not be the case.

Referring to FIG. 4A, network device 110 may provide the time value information and the ROI value information 405. For example, a user 402 may access network device 110, via an application of user device 150, to review a geographic area of access network 130 and end devices 140. For example, the application of user device 150 may be an RF planning tool application that supports a graphical user interface. The time value information and the ROI value information may be depicted, via the graphical user interface, as an overlay (e.g., in geo-bins) to map information associated with the geographic area.

Based on the time value information and the ROI value information, user 402 may select geo-bins subject to a new RF design 410. For example, user 402 may review the time value information and/or the ROI value information and determine whether the new RF design is triggered and/or what geo-bins (or geographic area) may be subject to the new RF design and node placement service. By way of further example, user 402 may identify geo-bins that are above a certain time value or have a particular color or other indicator, which may be indicative of a user experience level that may need a new RF design. User 402 may also identify geo-bins that may be below a user experience level and have ROI values that are relatively high or satisfy a certain threshold value or level.

Referring to FIG. 4B, user device 150 may calculate an RF design based on the selected geo-bins 415. For example, an automated cell planner or other type of RF planning tool may generate RF design information. User device 150 may collaboratively generate the RF design with network device 110 (e.g., client and server process). The RF design may address the user experience level associated with the selected geo-bins. As an example, different carrier nodes (e.g., low coverage/power nodes, small cell nodes (e.g., picocell, femtocell, relay nodes, etc.), iDAS, oDAS, 5G UWB nodes, CBRS nodes, LAA nodes, C-band nodes, etc.), may be optimally placed to off-load usage associated with the selected geo-bins and existing RAN device (e.g., eNB, etc.) and perhaps reduce usage for neighboring geo-bins and associated RAN device(s). The optimization may be based on the time value information associated with geo-bins and the RF design. For example, the optimization may include generating estimated time values and/or ROI values for selected geo-bins. The optimization may also include generating estimated time values and/or ROI values for geo-bins neighboring the selected geo-bins or more broadly at a sector level, a cell level, or even a larger geographic area.

The generation of the RF design information may include an iterative process based on different carrier nodes used, their placement, and other criteria applicable to the new RF design.

Referring to FIG. 4C, user device 150 may output the RF design information 420. For example, user device 150 may output the RF design information, via a graphical user interface, for review by user 402. User 402 may modify and/or approve the RF design, or request that another RF design be calculated or generated. According to this example, assume that user 402 provides user device 150 an indication of approval of the RF design information 425. Thereafter, various types of personnel may execute the RF design, which may include securing (e.g., leasing, etc.) the target locations for placement of the prospective RAN devices, purchasing the RAN devices, scheduling installations, and so forth.

Although FIGS. 4A-4C illustrate an exemplary embodiment of a process of the node placement service, according to other exemplary scenarios, the node placement service may perform additional operations, fewer operations, and/or different operations than those illustrated and described. For example, network device 110 and/or user device 150 may include logic that compares time value information and/or ROI value information of a geo-bin to a threshold value to determine whether a new RF design is triggered. Alternatively, for example, user 402 in combination with a recommendation from network device 110 and/or user device 150 may form the basis to determine whether a new RF design is triggered. Additionally, or alternatively, other operations of process 400 may be partially or wholly automated. According to yet another example, the RF design may be based on only the time value information or only on the ROI value information. For example, an entity may want to migrate from 4G to NR in a geographic area and may select geo-bins that may suffer from poor user experience or may have high ROI values. Other circumstances and/or situations may be envisioned.

FIG. 5 is a diagram illustrating exemplary components of a device 500 that may correspond to one or more of the devices described herein. For example, device 500 may correspond to network device 110, RAN devices of access network 130, end device 140, user device 150, and other systems, as described herein. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 510 may be implemented as hardware (e.g., a microprocessor, etc.) and may include one or multiple memories (e.g., cache, etc.). Processor 510 may include a dedicated element (e.g., a dedicated microprocessor) and/or a non-dedicated element (e.g., a non-dedicated/shared microprocessor, etc.).

Processor 510 may control the overall operation or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, etc.

Memory/storage 515 includes one or multiple memories and/or one or multiple other types of storage mediums. For example, memory/storage 515 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 515 may include a hard disk (e.g., a magnetic disk, an optical disk, a magneto-optic disk, a solid state disk, etc.), and/or a nanotechnology-based storage medium. Memory/storage 515 may include a drive for reading from and writing to the storage medium.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. Software 520 may also include firmware, middleware, microcode, hardware description language (HDL), and/or other form of instructions. As an example, with reference to network device 110, software 520 may include an application that, when executed by processor 510, manages a database or other repository that stores, manages, and/or has access to the information (e.g., network information, end device reports, etc.) and provides the node placement service, as described herein. According to another example, with reference to user device 150, software 520 may include an application that, when executed by processor 510, provides the node placement service, as described herein.

Communication interface 525 permits device 500 to communicate with other devices, networks, systems, and/or the like. Communication interface 525 includes one or multiple interfaces of one or multiple types (e.g., optical, wireless, wired). Communication interface 525 may include one or multiple transmitters and receivers, or transceivers. Communication interface 525 may operate according to a protocol stack and a communication standard. Communication interface 525 may include an antenna. Communication interface 525 may include various processing logic or circuitry (e.g., multiplexing/de-multiplexing, filtering, amplifying, converting, error correction, etc.).

Input 530 permits an input into device 500. For example, input 530 may include a keyboard, a mouse, a display, a touchscreen, a touchless screen, a button (e.g., a power button, a disaster recovery button, a virtual button, etc.), a switch, an input port, speech recognition logic, and/or some other type of visual, auditory, tactile, etc., input component. Output 535 permits an output from device 500. For example, output 535 may include a speaker, a display, a touchscreen, a touchless screen, a light, an output port, and/or some other type of visual, auditory, tactile, etc., output component.

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a process described herein. Alternatively, for example, according to other implementations, device 500 performs a process described herein based on the execution of hardware (processor 510, etc.).

Figure 6:
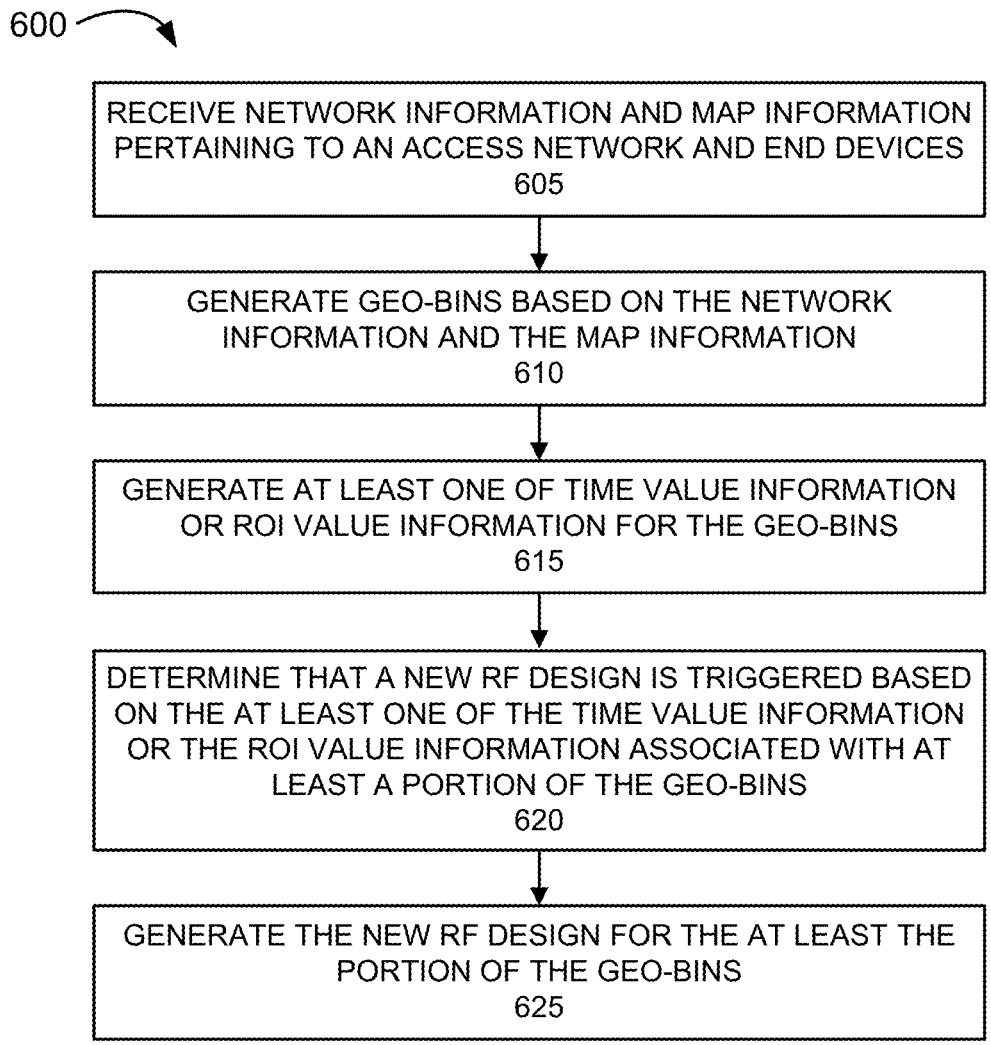
FIG. 6 is a flow diagram illustrating an exemplary process of the node placement service.

FIG. 6 is a flow diagram illustrating an exemplary process 600 of the node placement service. According to various exemplary embodiments, network device 110 and/or user device 150 may perform steps of process 600. For example, processor 510 may execute software 520 to perform a step illustrated in FIG. 6 and described herein. Alternatively, a step illustrated in FIG. 6 and described herein, may be performed by execution of only hardware. Further, a step may be only partially performed by the execution of software 520 or only hardware.

Referring to FIG. 6, in block 605, network device 110 may receive network information and map information pertaining to an access network (e.g., access network 130) and end devices (e.g., end devices 140).

In block 610, network device 110 may generate geo-bins based on the network and map information. The size of the geo-bins may be about the same size or smaller relative to the RAN's cell coverage, sector coverage, or antenna coverage, as previously described.

In block 615, network device 110 may generate at least one of time value information or ROI value information for the geo-bins. For example, network device 110 may generate the time value information based on the data volume values and throughput values, as described herein. Additionally, for example, network device 110 may generate the ROI value information based on the billing information associated with the network information and the geo-bins. Network device 110 may also prioritize the geo-bins based on their respective time values and/or ROI values.

In block 620, network device 110 may determine that a new RF design is triggered based on the least one of the time value information or the ROI value information associated with at least a portion of the geo-bins.

In block 625, network device 110 may generate the new RF design for the portion of the geo-bins. Network device 110 may generate the new RF design based on new estimated time values and/or ROI values for the portion of the geo-bins. Network device 110 may also generate new estimated time values and/or ROI values of geo-bins that may be neighbors to (at least) the portion of the geo-bins or other dimension of geo-bins, as described herein.

FIG. 6 illustrate an exemplary process 600 of the node placement service, however, according to other embodiments, process 600 may include additional operations, fewer operations, and/or different operations than those illustrated in FIG. 6 and described herein.

The foregoing description of embodiments provides illustration but is not intended to be exhaustive or to limit the embodiments to the precise form disclosed. In the preceding description, various embodiments have been described with reference to the accompanying drawings. However, various modifications and changes may be made thereto, and additional embodiments may be implemented, without departing from the broader scope of the invention as set forth in the claims that follow. The description and drawings are accordingly to be regarded as illustrative rather than restrictive.

In addition, while a series of blocks has been described with regard to the process illustrated in FIG. 6, the order of the blocks may be modified according to other embodiments. Further, non-dependent blocks may be performed in parallel. Additionally, other processes and/or operations described in this description may be modified and/or non-dependent operations may be performed in parallel.

As set forth in this description and illustrated by the drawings, reference is made to "an exemplary embodiment," "an embodiment," "embodiments," etc., which may include a particular feature, structure, or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515. The non-transitory computer-readable storage medium may be implemented in a centralized, distributed, or logical division that may include a single physical memory device or multiple physical memory devices spread across one or multiple devices.

To the extent the aforementioned embodiments collect, store, or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction described in this description should be construed as critical or essential to the embodiments described herein unless explicitly described as such.

All structural and functional equivalents to the elements of the various aspects set forth in this disclosure that are known or later come to be known are expressly incorporated herein by reference and are intended to be encompassed by the claims.

What is claimed is:

1. A method comprising:
   calculating, by a network device, time values for geo-bins of a first radio access network (RAN) device based on network information and data volume values associated with the geo-bins; and
   generating, by the network device based on the time values, radio frequency (RF) design information for the geo-bins.

2. The method of claim 1, wherein each of the geo-bins is a geographic segmentation of the first RAN device's wireless coverage area.

3. The method of claim 1, wherein the network information includes traffic information and location information associated with end devices.

4. The method of claim 1, wherein the time values indicate time periods that resources of the first RAN device are used.

5. The method of claim 1, further comprising:
   determining, by the network device, that each time value of the time values does not satisfy a threshold time value.

6. The method of claim 1, wherein the RF design information includes a location for a second RAN device that is to be prospectively added to provide wireless coverage in the geo-bins.

7. The method of claim 1, wherein the calculating comprises:
   calculating, by the network device, the time values based on a ratio between data volume values and performance metric values associated with the geo-bins.

8. The method of claim 1, further comprising:
   calculating, by the network device, return on investment values for the geo-bins based on the network information and billing information associated with end devices, and
   determining, by the network device, to generate the RF design information for the geo-bins based on the time values and the return on investment values.

9. A device comprising:
   a processor configured to:
   calculate time values for geo-bins of a first radio access network (RAN) device based on network information and data volume values associated with the geo-bins; and
   generate based on the time values, radio frequency (RF) design information for the geo-bins.

10. The device of claim 9, wherein each of the geo-bins is a geographic segmentation of the first RAN device's wireless coverage area.

11. The device of claim 9, wherein the network information includes traffic information and location information associated with end devices.

12. The device of claim 9, wherein the time values indicate time periods that resources of the first RAN device are used.

13. The device of claim 9, wherein the processor is further configured to:
   determine that each time value of the time values does not satisfy a threshold time value.

14. The device of claim 9, wherein the RF design information includes a location for a second RAN device that is to be prospectively added to provide wireless coverage in the geo-bins.

15. The device of claim 9, wherein to calculate, the processor is further configured to:
   calculate the time values based on a ratio between data volume values and performance metric values associated with the geo-bins.

16. The device of claim 9, wherein the processor is further configured to:
   calculate a return on investment value for the geo-bins based on the network information and billing information associated with end devices, and
   determine to generate the RF design information for the geo-bins based on the time values and the return on investment values.

17. A non-transitory, computer-readable storage medium storing instructions executable by a processor of a device, which when executed cause the device to:
   calculate time values for geo-bins of a radio access network (RAN) device based on network information and data volume values associated with the geo-bins; and
   generate based on the time values, radio frequency (RF) design information for the geo-bins.

18. The non-transitory, computer-readable storage medium of claim 17, wherein the time values indicate time periods that resources of the RAN device are used.

19. The non-transitory, computer-readable storage medium of claim 17, wherein the instructions to calculate further comprise instructions, which when executed cause the device to:
   calculate the time values based on a ratio between data volume values and performance metric values associated with the geo-bins.

20. The non-transitory, computer-readable storage medium of claim 17, wherein the instructions further comprise instructions, which when executed cause the device to:
   determine that each time value of the time values does not satisfy a threshold time value.

* * * * *